US012768080B2

(12) United States Patent
Chiang et al.

(10) Patent No.: US 12,768,080 B2
(45) Date of Patent: Oct. 20, 2026

(54) PREPARATION METHOD OF PHOTOCHROMIC POLYPROPYLENE FIBER

(71) Applicant: TAIWAN TEXTILE RESEARCH INSTITUTE, New Taipei City (TW)

(72) Inventors: Jo-Cheng Chiang, New Taipei City (TW); Sheng-Shan Chang, New Taipei City (TW); Yun-Yu Chen, New Taipei City (TW)

(73) Assignee: TAIWAN TEXTILE RESEARCH INSTITUTE, New Taipei City (TW)

( * ) Notice: Subject to any disclaimer, the term of this patent is extended or adjusted under 35 U.S.C. 154(b) by 68 days.

(21) Appl. No.: 19/055,585

(22) Filed: Feb. 18, 2025

(65) Prior Publication Data

US 2025/0188649 A1 Jun. 12, 2025

Related U.S. Application Data

(62) Division of application No. 17/145,434, filed on Jan. 11, 2021, now Pat. No. 12,264,414.

(30) Foreign Application Priority Data

Apr. 20, 2020 (TW) ................................ 109113202

(51) Int. Cl.

| | |
|---|---|
| ***D01F 1/10*** | (2006.01) |
| ***C08J 3/22*** | (2006.01) |
| ***C08K 5/00*** | (2006.01) |
| ***C08K 5/3435*** | (2006.01) |
| ***C08K 5/3492*** | (2006.01) |
| ***C08K 5/524*** | (2006.01) |

(Continued)

(52) U.S. Cl.

CPC ................ *D01F 1/106* (2013.01); *C08J 3/22* (2013.01); *C08K 5/005* (2013.01); *C08K 5/3435* (2013.01); *C08K 5/3492* (2013.01); *C08K 5/524* (2013.01); *C08K 5/527* (2013.01); *D01D 5/08* (2013.01); *D01F 6/06* (2013.01); *G02B 5/223* (2013.01); *G02B 5/23* (2013.01); *C08J 2323/12* (2013.01)

(58) Field of Classification Search

CPC ......... C08J 2323/12; C08J 3/22; C08K 5/005; C08K 5/3435; C08K 5/3492; C08K 5/524; C08K 5/527; C08K 5/0041; C08K 5/3417; C08K 5/35; C08K 5/357; D01D 5/08; D01F 1/106; D01F 6/06; G02B 5/226; G02B 5/23; C08L 23/10; C08L 23/12; C08L 2310/00; C08L 79/04; G06F 11/0739; G06F 11/0796; G06F 11/1441; G06F 11/1629; G06F 11/2263; G06N 20/00; G06N 5/04; G06T 1/20

USPC .......................................................... 428/394

See application file for complete search history.

(56) References Cited

U.S. PATENT DOCUMENTS 6,172,153 B1 1/2001 Starsinic
7,452,611 B2 11/2008 Blackburn et al.

(Continued)

FOREIGN PATENT DOCUMENTS

CN 103556300 A 2/2014
CN 103556276 B 10/2015

(Continued)

OTHER PUBLICATIONS

Little, Anna F. et al., "Textile applications of commercial photochromic dyes. Part 6: photochromic polypropylene fibres", Coloration Technology, vol. 132, No. Jun. 29, 2016 (Jun. 29, 2016), pp. 304-309, ISSN: 1472-3581 DOI: 16.1111/cote. 12221.

(Continued)

*Primary Examiner* — Lynda Salvatore
(74) *Attorney, Agent, or Firm* — McClure, Qualey & Rodack, LLP

(57) ABSTRACT

A preparation method of the photochromic polypropylene fiber includes steps below. A photochromic masterbatch is prepared. An ultraviolet light absorber masterbatch is prepared. The ultraviolet light absorber includes

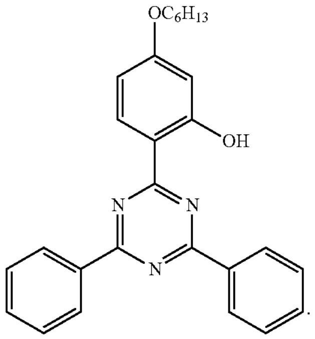

A light stabilizer masterbatch is prepared. The light stabilizer includes

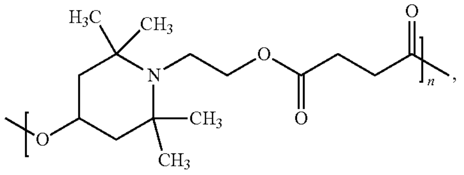

and n is 10 to 14. A masterbatch mixing step is performed. A melt-spinning step is performed. The photochromic polypropylene mixture is melt-spun to obtain the photochromic polypropylene fiber.

4 Claims, No Drawings

(51) Int. Cl.

| | |
|---|---|
| ***C08K 5/527*** | (2006.01) |
| ***D01D 5/08*** | (2006.01) |
| ***D01F 6/06*** | (2006.01) |
| ***G02B 5/22*** | (2006.01) |
| ***G02B 5/23*** | (2006.01) |

(56) References Cited

U.S. PATENT DOCUMENTS

| | | | |
|---|---|---|---|
| 8,262,945 | B2 | 9/2012 | Destro et al. |
| 9,200,386 | B2 | 12/2015 | Chiang et al. |
| 9,528,004 | B2 | 12/2016 | Ribi |
| 2014/0023863 | A1 | 1/2014 | Gijsman et al. |
| 2018/0196165 | A1 | 7/2018 | Chang |
| 2020/0157342 | A1 | 5/2020 | Young et al. |

FOREIGN PATENT DOCUMENTS

| | | | | | |
|---|---|---|---|---|---|
| CN | 109402780 | A | | 3/2019 | |
| JP | 2001207326 | A1 | | 8/2001 | |
| KR | 100846665 | B1 | | 7/2008 | |
| KR | 102050574 | B1 | * | 11/2019 | ............... D06N 3/14 |
| TV | 201718960 | A | | 6/2017 | |
| TW | 200512281 | A | | 4/2005 | |
| TW | 1293343 | B | | 2/2008 | |
| TW | 201234987 | A | | 9/2012 | |
| TW | 202037703 | A | | 10/2020 | |
| WO | 2005030856 | A1 | | 4/2005 | |

OTHER PUBLICATIONS

Homola, Timothy J., "Photochromic Plastic Stabilization and Matrix Interactions", Molecular Crystals and Liquid Crystals, vol. 344, No. 1, Jun. 2000 (Jun. 1, 2000), pp. 63-68, ISSN: 1058-725X, DOI: 10.1080/10587250008023815.

Kamata, Kazuhiro et al., "Photochromic polyolefin fibers exhibiting no dioxin evolution and blooming comprising polyolefin fibers containing organic photochromic compounds with molecular weight .gtoreq.300", XP002803843, retrieved from STN Database accession No. 2001:563792.

* cited by examiner

PREPARATION METHOD OF PHOTOCHROMIC POLYPROPYLENE FIBER

CROSS REFERENCE TO RELATED APPLICATION

The present application is a Divisional Application of the U.S. application Ser. No. 17/145,434, filed Jan. 11, 2021, which claims priority to Taiwan Application Serial Number 109113202, filed Apr. 20, 2020, all of which are herein incorporated by reference in their entireties.

BACKGROUND

Field of Invention

The present disclosure relates to a textile material, in particular to a photochromic polypropylene fiber and a preparation method of the photochromic polypropylene fiber.

Description of Related Art

The textile industry is facing strong competitive pressure under the trend of globalization. The textile industry must continue to develop new technologies and diversified products to face global competition.

A photochromic fiber is a fiber that can automatically change color after being stimulated by light. The photochromic fiber can change color under the irradiation of a certain wavelength of light, and under the irradiation of another wavelength of light (or heat), it will reversibly change back to its original color. The photochromic fiber is mainly used in entertainment clothing, safety clothing, decorations, anti-counterfeiting signs, and so on. However, the existing preparation methods are quite complicated, and the produced photochromic fibers are prone to yellowing and the photochromic life is not long.

SUMMARY

In view of this, the present disclosure provides a photochromic polypropylene fiber and a preparation method of the photochromic polypropylene fiber. The use of a single main component melt-spinning technology can produce photochromic fibers that are not easy to undergo yellowing and have the effect of reducing the fiber background color, and prolong the life of the photochromic fiber to change color after being stimulated by lights.

One aspect of the present disclosure provides a photochromic polypropylene fiber. The photochromic polypropylene fiber includes about 98 to 99 parts by weight of polypropylene, about 0.2 to 0.8 parts by weight of a photochromic agent, about 0.1 to 1 parts by weight of an ultraviolet absorber, and about 0.1 to 1 parts by weight of a light stabilizer. The ultraviolet absorber includes

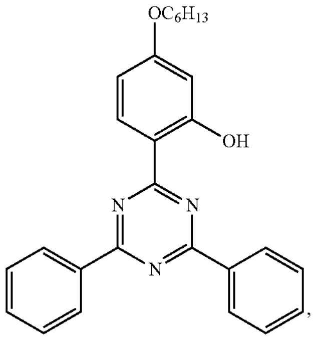

and the light stabilizer includes

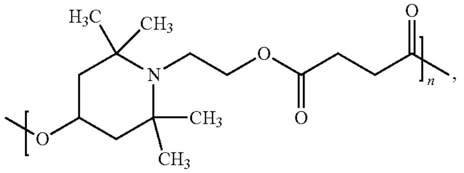

wherein n is 10-14.

In one embodiment of the present disclosure, the photochromic polypropylene fiber further includes about 0.2 to 0.3 parts by weight of an antioxidant.

Another aspect of the present disclosure provides a preparation method of the photochromic polypropylene fiber. The preparation method includes steps below. The preparation of a photochromic masterbatch includes uniformly mixing 95 parts by weight of polypropylene and 5 parts by weight of a photochromic agent, and performing a powder refining step, a powder dispersion step, and a compounding and granulation step to form the photochromic masterbatch. The preparation of an ultraviolet light absorber masterbatch includes uniformly mixing of 90 parts by weight of polypropylene and 10 parts by weight of an ultraviolet light absorber, and performing a powder refining step, a powder dispersion step, and a compounding and granulation step to form the ultraviolet light absorber masterbatch. The ultraviolet light absorber includes

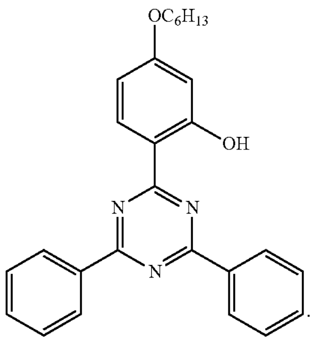

The preparation of a light stabilizer masterbatch includes uniformly mixing 90 parts by weight of polypropylene and 10 parts by weight of a light stabilizer, and then a powder refining step, a powder dispersion step, and a compounding and granulation step are performed to form the light stabilizer masterbatch. The light stabilizer includes

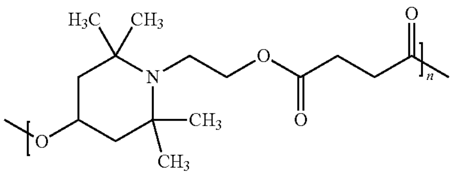, and n is 10 to 14. A masterbatch mixing step is performed. 100 parts by weight of the photochromic masterbatch, 10-100 parts by weight of the ultraviolet light absorber masterbatch, 10-100 parts by weight of the light stabilizer masterbatch, and 760-800 parts by weight of polypropylene masterbatch are mixed to obtain a photochromic polypropylene mixture. A melt-spinning step is performed. The photochromic polypropylene mixture is melt-spun to obtain the photochromic polypropylene fiber.

In one embodiment of the present disclosure, the preparation method further includes steps below. The preparation of an antioxidant masterbatch includes uniformly mixing 90 parts by weight of polypropylene and 10 parts by weight of an antioxidant, and then a powder refining step, a powder dispersion step, and a compounding and granulation step are performed to form the antioxidant masterbatch. In the foregoing masterbatch mixing step, 25 parts by weight of the antioxidant masterbatch is added to form the photochromic polypropylene mixture.

In one embodiment of the present disclosure, the antioxidant is a phosphite antioxidant which including spiro phosphates and derivatives thereof.

In one embodiment of the present disclosure, the phosphite antioxidant has a structure represented by any one of the following formula (1) to formula (4):

formula (1)

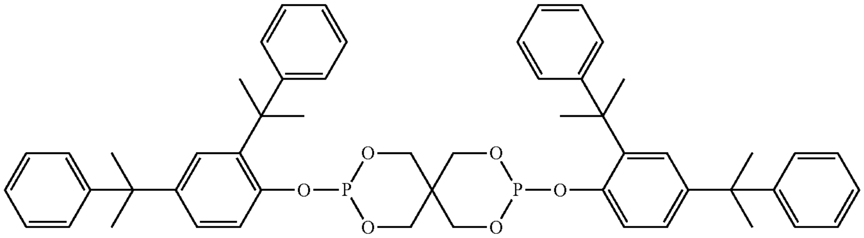

formula (2)

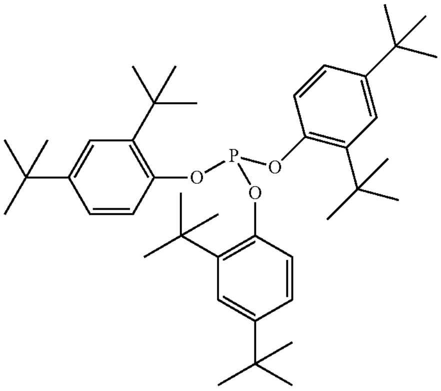

formula (3)

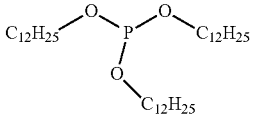

formula (4)

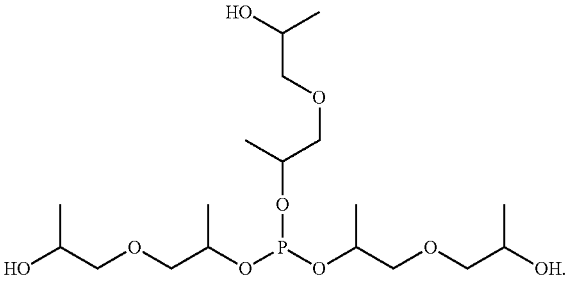

DETAILED DESCRIPTION

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

The present disclosure provides a photochromic polypropylene fiber. The photochromic polypropylene fiber includes about 98 to 99 parts by weight of polypropylene, about 0.2 to 0.8 parts by weight of a photochromic agent, about 0.1 to 1 parts by weight of an ultraviolet absorber, and about 0.1 to 1 parts by weight of a light stabilizer. It is noted that the ultraviolet absorber includes

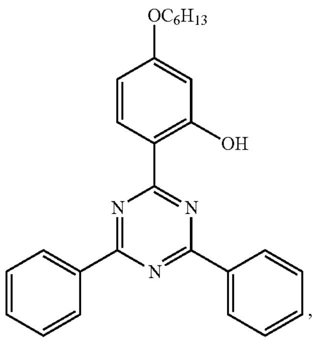

and the light stabilizer includes

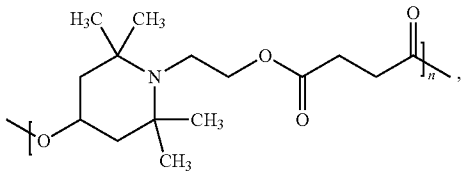

in which n is 10-14.

The present disclosure uses polypropylene (PP) as a base material. The main advantage is that in addition to high impact resistance, tough mechanical properties, and resistance to a variety of organic solvents and acid-base corrosion, polypropylene can also reduce the impact of moisture content. More specifically, the higher the moisture content of the textile material, the more likely it will affect its physical and mechanical properties, such as strength, elongation, electrical resistance, and specific gravity, and even the subsequent spinning processing has a certain degree of difficulty.

In some embodiments, the photochromic agent is a photochromic agent that can cause color change under ultraviolet light or sunlight. The photochromic agent can absorb the energy of ultraviolet light or sunlight, and then change the molecular structure and produce the color change. However, when the energy of ultraviolet light/sunlight is lost, the original molecular structure and original color are restored. In one embodiment, the photochromic agent may include spirooxazine and derivatives thereof. In one embodiment, the photochromic agent may include spiroyarn and derivatives thereof. To be specific, the photochromic agent may be a photochromic agent that turns purple when exposes to ultraviolet light or sunlight. For example, the photochromic agent is product NCC #12 purchased from Chong-Yue Co., Ltd.

In one embodiment, the photochromic agent may have a structure represented by the following formula (I) or formula (II):

formula (I)

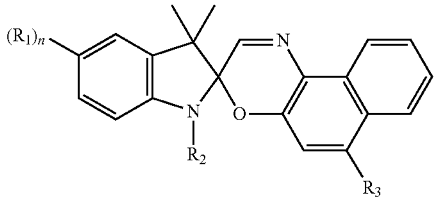

formula (II)

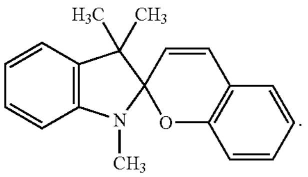

In formula (I), each $R_1$ includes —H, —Br, —$N_2O$, $C_1$-$C_6$ alkyl, or $C_1$-$C_6$ alkoxy; n is an integer from 1-3, when n is equal to or greater than 2, two or more $R_1$ may be connected to each other to form a $C_6$-$C_{10}$ aromatic ring; $R_2$ includes —H or $C_1$-$C_6$ alkyl; and $R_3$ includes —H, imino group, or 5-membered or 6-membered nitrogen-containing heterocyclic group.

More specifically, the photochromic agent may have a structure represented by any one of formula (I-1) to formula (I-10):

formula (I-1)

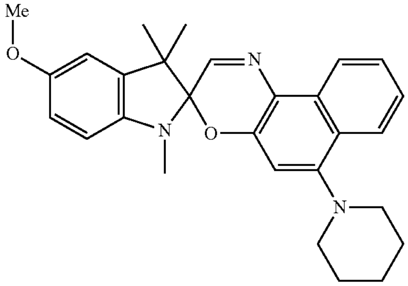

formula (I-2)

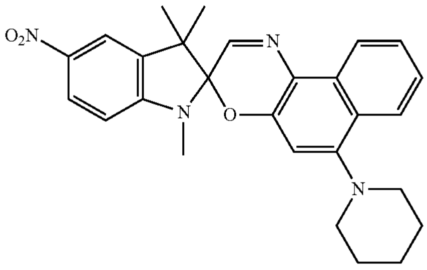

formula (I-3)

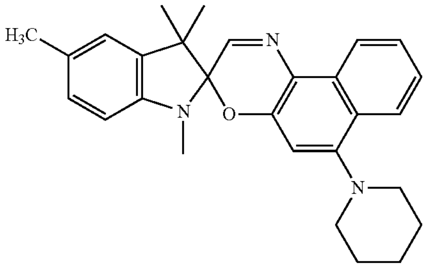

-continued formula (I-4)

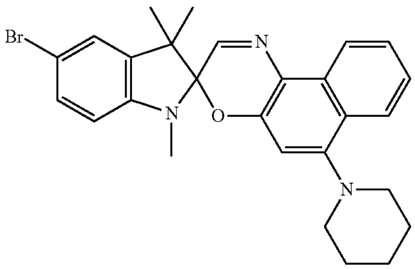

formula (I-5)

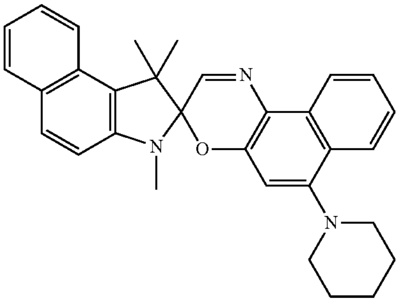

formula (I-6)

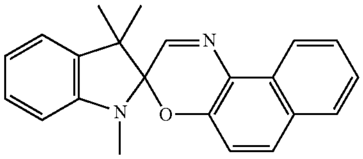

formula (I-7)

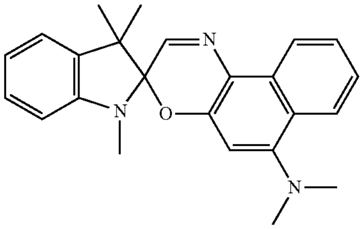

formulal (I-8)

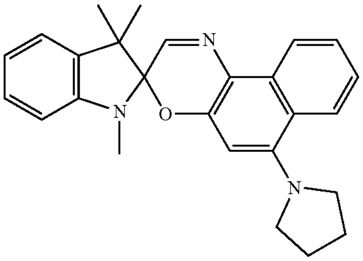

formula (I-9)

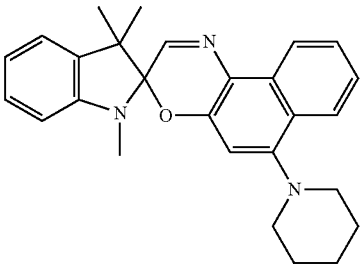

-continued formula (I-10)

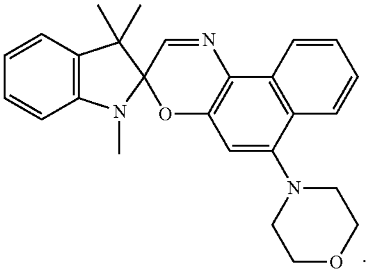

In some embodiments, the ultraviolet absorber may convert high-energy ultraviolet light energy into heat or release non-destructive long light waves, thereby avoiding yellowing, reduced gloss and weakened physical properties caused by ultraviolet rays in the light source. In some embodiments, the ultraviolet absorber includes triazine ultraviolet absorber. In one embodiment, the ultraviolet absorber includes 2-(4,6-Diphenyl-1,3,5-triazin-2-yl)-5-hexyloxy-phenol, having chemical structure as

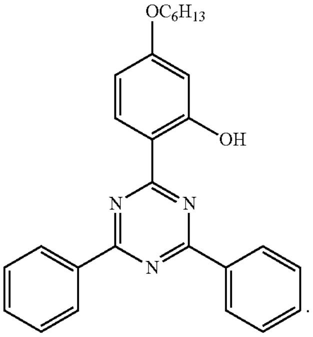

In one embodiment, the molecular weight of the ultraviolet absorber is 425. To be specific, the ultraviolet absorber is, for example, product Eversorb 41 FD purchased from Everlight Chemical.

In some embodiments, the light stabilizer may effectively inhibit the physical and chemical processes of photodegradation. When a polymer material is exposed under sunlight or strong fluorescence light for a long time and absorbs the energy of ultraviolet rays, it is auto-oxidized and degraded, thereby making the products be discolored, brittle, performance-degraded and even unusable. Therefore, the addition of the light stabilizer may capture the free radicals that cause deterioration, block the chain reaction of light and oxygen aging, effectively protect the polymer, and avoid the yellowing, gloss reduction and weakening of physical properties caused by photothermal aging. In one embodiment, the light stabilizer includes a polymer formed by butanedioic acid, dimethyl ester, and 4-hydroxy-2,2,6,6-tertamethyl-1-piperdine ethanol, and the polymer has chemical structure as

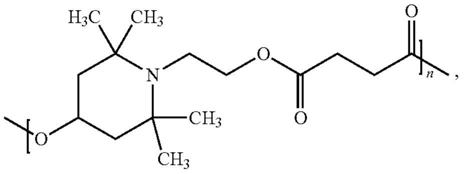

in which n is 10-14. In one embodiment, the molecular weight of the light stabilizer is about 3100-4000. To be specific, the light stabilizer is, for example, product Eversorb 94 FD purchased from Everlight Chemical.

In some embodiments, the photochromic polypropylene fiber further includes about 0.2-0.3 parts by weight of antioxidant. In some embodiments, the antioxidant includes phosphite antioxidants including spiro phosphates and derivatives thereof. The phosphite antioxidants have good compatibility with polypropylene, so they can withstand the processing temperature of polypropylene. Further, compared with hindered phenolic antioxidants, the phosphite antioxidants used in the present disclosure may smoothly perform continuous melt-spinning, thereby improving spinning efficiency.

In the photochromic polypropylene fiber of the present disclosure, by adding a specific proportion of phosphite antioxidants into polypropylene, the yellowing phenomenon produced during fiber processing can be significantly improved, the color change effect is more obvious, and the fiber background color can be effectively reduced. In the present disclosure, the content of the phosphite antioxidant is controlled between about 0.2 and 0.3 parts by weight, which can achieve the best spinning efficiency and reduce the effect of fiber background color.

In one embodiment, the phosphite antioxidant may have a structure represented by any one of formula (1) to formula (4):

In one embodiment, the phosphite antioxidant is, for example, product Revonox 608 purchased from Chitec Technology. In another embodiment, the phosphite antioxidant is, for example, product Everaox 168, Everaox201, and Everaox 204 purchased from Yongan Chemical.

In one embodiment, the photochromic polypropylene fiber of present disclosure further includes about 0.05-0.1 parts by weight of dispersant. In one embodiment, the dispersant includes polyester dispersants. In one embodiment, the dispersant is, for example, product D 1377E purchased from EMS-Griltex.

The exemplary structures or product models of the components listed above are for illustrative purposes only and are not used to limit the present invention. Each component can also use other structures or other product models, as long as the photochromic polypropylene fiber of the present disclosure can be prepared.

The present disclosure also provides a preparation method of the photochromic polypropylene fiber including the steps below. First, the preparation of a photochromic masterbatch includes uniformly mixing 95 parts by weight of polypropylene and 5 parts by weight of the photochromic agent, and performing a powder refining step, a powder dispersion step, and a compounding and granulation step to form the photochromic masterbatch. In one embodiment, in the foregoing step of preparing the photochromic masterbatch, an addiformulla (1)

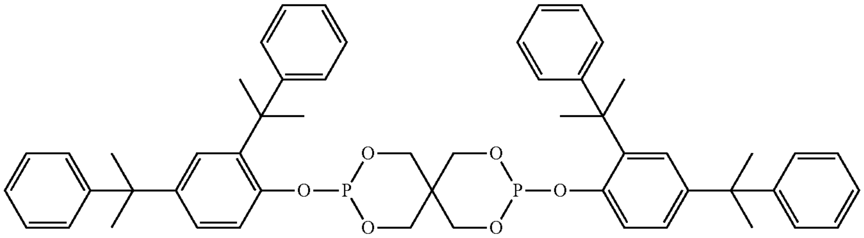

formula (2)

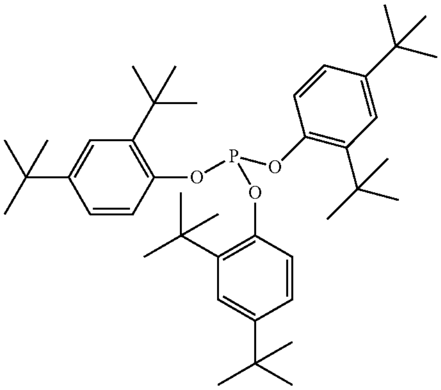

formula (3)

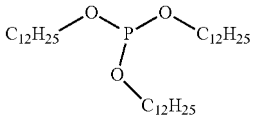

formula (4)

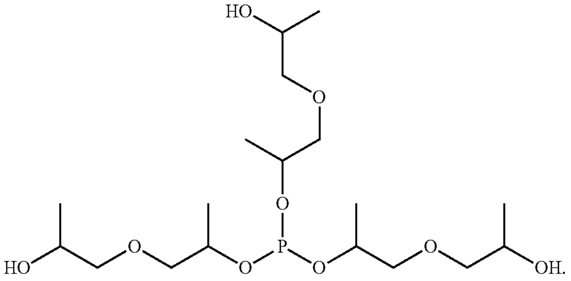

tional 0.1 parts by weight of solid dispersant may be added and mixed uniformly. In one embodiment, the powder refining step is dry grinding, the particle size is ground to about 300-400 nm, and the operating condition is grinding at 500 rpm for 3 minutes. In one embodiment, the operating conditions of the powder dispersion step are dispersion for 10 minutes at 500 rpm. In one embodiment, the compounding temperature of the compounding and granulation step is about 220° C.-240° C., and the screw speed is about 200 rpm.

Next, the preparation of an ultraviolet light absorber masterbatch includes uniformly mixing of 90 parts by weight of polypropylene and 10 parts by weight of an ultraviolet light absorber, and performing a powder refining step, a powder dispersion step, and a compounding and granulation step to form the ultraviolet light absorber masterbatch. The ultraviolet light absorber includes

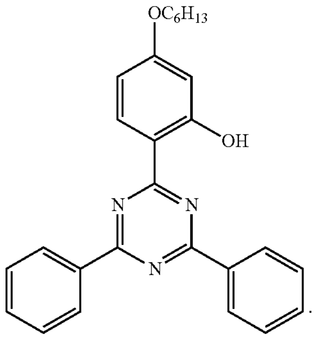

In one embodiment, in the foregoing step of preparing the ultraviolet light absorber masterbatch, an additional 0.1 parts by weight of solid dispersant may be added and mixed uniformly. In one embodiment, the powder refining step is dry grinding, the particle size is ground to about 300-400 nm, and the operating condition is grinding at 500 rpm for 3 minutes. In one embodiment, the operating conditions of the powder dispersion step are dispersion for 10 minutes at 500 rpm. In one embodiment, the compounding temperature of the compounding and granulation step is about 220° C.-240° C., and the screw speed is about 200 rpm.

Then, the preparation of a light stabilizer masterbatch includes uniformly mixing 90 parts by weight of polypropylene and 10 parts by weight of a light stabilizer, and then a powder refining step, a powder dispersion step, and a compounding and granulation step are performed to form the light stabilizer masterbatch. The light stabilizer includes

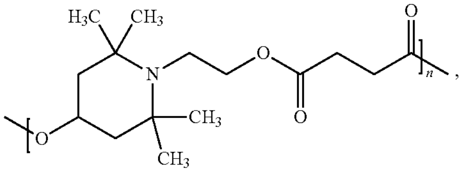

in which n is 10-14. In one embodiment, in the foregoing step of preparing the light stabilizer masterbatch, an additional 0.1 parts by weight of solid dispersant may be added and mixed uniformly. In one embodiment, the powder refining step is dry grinding, the particle size is ground to about 300-400 nm, and the operating condition is grinding at 500 rpm for 3 minutes. In one embodiment, the operating conditions of the powder dispersion step are dispersion for 10 minutes at 500 rpm. In one embodiment, the compounding temperature of the compounding and granulation step is about 220° C.-240° C., and the screw speed is about 200 rpm.

About 100 parts by weight of the photochromic masterbatch, 10-100 parts by weight of the ultraviolet light absorber masterbatch, 10-100 parts by weight of the light stabilizer masterbatch, and 760-800 parts by weight of polypropylene masterbatch are mixed to obtain a photochromic polypropylene mixture.

A melt-spinning step is then performed. The photochromic polypropylene mixture is melt-spun to obtain the photochromic polypropylene fiber. In one embodiment, the spinning temperature of fiber spinning conditions is about 220° C.-230° C., and the winding speed is about 700 m/min.

In one embodiment, the preparation method of the photochromic polypropylene fiber further includes preparing an antioxidant masterbatch. The preparation of an antioxidant masterbatch includes uniformly mixing 90 parts by weight of polypropylene and 10 parts by weight of an antioxidant, and then a powder refining step, a powder dispersion step, and a compounding and granulation step are performed to form the antioxidant masterbatch. In the foregoing masterbatch mixing step, 25 parts by weight of the antioxidant masterbatch is added to form the photochromic polypropylene mixture. In one embodiment, the powder refining step is dry grinding, the particle size is ground to about 300-500 nm, and the operating condition is grinding at 500 rpm for 3 minutes. In one embodiment, the operating conditions of the powder dispersion step are dispersion for 10 minutes at 500 rpm. In one embodiment, the compounding temperature of the compounding and granulation step is about 220° C.-240° C., and the screw speed is about 200 rpm.

The following Examples are provided to illustrate certain aspects of the present disclosure and to aid those of skill in the art in practicing this disclosure. These Examples are in no way to be considered to limit the scope of the disclosure in any manner.

Experimental Example 1

Masterbatch Preparation

In this experimental example, the photochromic masterbatch, the antioxidant masterbatch, the ultraviolet light absorber masterbatch, and the light stabilizer masterbatch were prepared according to the masterbatch recipe in Table 1 below.

TABLE 1

| Masterbatch Sample | Masterbatch Recipe: Polypropylene | Photochromic Agent | Antioxidant | Ultraviolet Absorber | Light Stabilizer | Dispersant |
|---|---|---|---|---|---|---|
| Photochromic Masterbatch | 94.9 | 5 | — | — | — | 0.1 |
| Antioxidant Masterbatch | 90 | — | 10 | — | — | — |
| Ultraviolet Light Absorber Masterbatch | 89.9 | — | — | 10 | — | 0.1 |
| Light Stabilizer Masterbatch | 89.9 | — | — | — | 10 | 0.1 |

Remark 1: Units were parts by weight.
Remark 2: The photochromic agent was product NCC#12 having general formula (I-10) purchased from Chong-Yue Co., Ltd.
Remark 3: The antioxidant was product Revonox 608 purchased from Chitec Technology.
Remark 4: The dispersant was product D 1377E purchased from EMS-Griltex.
Remark 5: The ultraviolet absorber was product Eversorb 41FD purchased from Everlight Chemical.
Remark 6: The light stabilizer was product Eversorb 94FD purchased from Everlight Chemical.

Experimental Example 2

The Preparation of the Photochromic Polypropylene Fiber and the Property Testing Thereof In this experimental example, different combinations of the ultraviolet light absorbers and the light stabilizers and different ratios of the components were selected to prepare various photochromic polypropylene fibers as shown in Table 2 below. The fiber mechanical properties of these photochromic polypropylene fibers had been tested with good spinning performance.

Experimental Example 3

The Ultraviolet (UV) Light Test

In this experimental example, these photochromic polypropylene fibers were irradiated by using the UV light. The color change effect and L*a*b* color space properties of these photochromic polypropylene fibers were shown in Table 3.

TABLE 2

| | Composition Recipe | | | | | | | Fiber Mechanical Properties | | |
|---|---|---|---|---|---|---|---|---|---|---|
| | Poly-propylene | Photo-chromic Agent | First Ultra-violet Absorber | Second Ultra-violet Absorber | First Light Stabilizer | Second Light Stabilizer | Anti-oxidant | Fiber Sizes (d/12 f) | Fiber Strength (g/d) | Fiber Elon-gation (%) |
| Comparative Example 1 | 99.5 | 0.5 | — | — | — | — | — | 103 | 2.62 | 71 |
| Comparative Example 2 | 99.25 | 0.5 | — | — | — | — | 0.25 | 101 | 2.53 | 71 |
| Comparative Example 3 | 98.4 | 0.5 | 0.1 | — | — | 1 | — | 109 | 2.43 | 76 |
| Comparative Example 4 | 98.15 | 0.5 | 0.1 | — | — | 1 | 0.25 | 108 | 2.41 | 77 |
| Comparative Example 5 | 98.4 | 0.5 | — | 0.1 | 1 | — | — | 115 | 2.04 | 93 |
| Comparative Example 6 | 98.15 | 0.5 | — | 0.1 | 1 | — | 0.25 | 109 | 2.01 | 92 |
| Comparative Example 7 | 99.15 | 0.5 | — | 0.1 | — | — | 0.25 | 101 | 2.52 | 69 |
| Comparative Example 8 | 98.25 | 0.5 | — | — | — | 1 | 0.25 | 102 | 2.54 | 70 |
| Example 1 | 98.4 | 0.5 | — | 0.1 | — | 1 | — | 104 | 2.57 | 72 |
| Example 2 | 98.15 | 0.5 | — | 0.1 | — | 1 | 0.25 | 103 | 2.53 | 73 |
| Example 3 | 98.25 | 0.5 | — | 0.5 | — | 0.5 | 0.25 | 104 | 2.54 | 75 |
| Example 4 | 98.15 | 0.5 | — | 1 | — | 0.1 | 0.25 | 109 | 2.51 | 78 |

Remark 1: The units in the composition recipe were parts by weight.
Remark 2: The photochromic agent was product NCC#12 having general formula (I-10) purchased from Chong-Yue Co., Ltd.
Remark 3: The first ultraviolet absorber was product Eversorb 12 purchased from Everlight Chemical.
Remark 4: The second ultraviolet absorber was product Eversorb 41FD purchased from Everlight Chemical.
Remark 5: The first light stabilizer was product Eversorb 90 purchased from Everlight Chemical.
Remark 6: The second light stabilizer was product Eversorb 94FD purchased from Everlight Chemical.
Remark 7: The antioxidant was product Revonox 608 purchased from Chitec Technology.

TABLE 3

| | Exposure Time (4 hours) | Exposure Time (12 hours) | Exposure Time (24 hours) | Color Change Effect | L* | a* | b* |
|---|---|---|---|---|---|---|---|
| Comparative Example 1 | X | X | X | None | 84.7 | +5.4 | +1.5 |
| Comparative Example 2 | ◎ | X | X | None | 84.3 | +3.5 | −2.2 |
| Comparative Example 3 | ◎ | ◎ | Δ | Bad | 89.6 | +1.1 | +5 |
| Comparative Example 4 | ◎ | Δ | X | None | 88.6 | +1.8 | +3.5 |
| Comparative Example 5 | ◎ | Δ | Δ | Bad | 86 | +3.8 | +2.9 |
| Comparative Example 6 | ◎ | Δ | X | None | 86.6 | +3 | +2.1 |
| Comparative Example 7 | ◎ | Δ | Δ | Bad | 84.1 | +2.9 | −2.6 |
| Comparative Example 8 | ◎ | Δ | Δ | Bad | 85.7 | +4.9 | −1.7 |
| Example 1 | ◎ | ◎ | ◎ | Optimum | 89.5 | +1.3 | +3.8 |
| Example 2 | ◎ | ◎ | ◎ | Optimum | 88.2 | +1.2 | +2.3 |
| Example 3 | ◎ | ◎ | ◎ | Optimum | 84.3 | +2.6 | −3.2 |
| Example 4 | ◎ | ◎ | ◎ | Optimum | 84.4 | +1.2 | −3.6 |

Remark 1: L* represented brightness.
Remark 2: a* represented the dimension of color. If the a* value was positive (+), the tested sample was red hue. If the a* value was negative (−), the tested sample was green hue.
Remark 3: b* represented the dimension of color. If the b* value was positive (+), the tested sample was yellow hue. If the b* value was negative (−), the tested sample was blue hue.
Remark 4: ◎ represented excellent color change; Δ represented poor color change; and X represented no color change.

It could be seen from Table 3 that the difference between comparative example 1 and comparative example 2 is that comparative example 1 used a recipe without adding antioxidants. Since the fibers had been already produced yellowing, the fibers of comparative example 1 and comparative example 2 had no color change effect. Although comparative example 2 used a recipe with adding antioxidants, its color change effect was still not as expected after lengthening the exposure time of ultraviolet light.

It could be seen from comparative example 3 and comparative example 4 that the recipe with the first ultraviolet light absorber (product Eversorb 12 purchased from Everlight Chemical) added, the color change effect is not good or the color does not change after the extended ultraviolet light irradiation time. Therefore, the optimum ultraviolet light absorber shall be the second ultraviolet light absorber (product Eversorb 41FD purchased from Everlight Chemical). It could be seen from comparative example 5 and comparative example 6 that the recipe with the first light stabilizer (product Eversorb 90 purchased from Everlight Chemical) added, the color change effect is not good or the color does not change after the extended ultraviolet light irradiation time. Therefore, the optimum light stabilizer shall be the second light stabilizer (product Eversorb 94FD purchased from Everlight Chemical).

Comparative example 7 used a recipe only added with the second ultraviolet light absorber and without the second light stabilizer, so its color change effect is not good. Comparative example 8 used a recipe only added with the second light stabilizer and without the second ultraviolet light absorber, so its color change effect is not good. It could be seen from the above that the second ultraviolet light absorber and the second light stabilizer shall be used in combination to have the advantages of the photochromic polypropylene fiber with excellent color change effect as in examples 1 to 4 of the present disclosure.

It could be seen from the L*a*b* values of example 1 and example 2 that the fiber with antioxidant recipe had a white fiber color. In other words, the photochromic polypropylene fiber added with antioxidant formula had the effect of reducing the fiber background color. It could be seen from example 3 and example 4 that in the case of increasing the UV exposure time, the service life of the photochromic polypropylene fiber can be extended by controlling the addition amount of the second ultraviolet light absorber to 0.1-1 parts by weight and the addition amount of the second light stabilizer to 0.1-1 parts by weight.

Experimental Example 4

The Color Matching Test

In this experimental example, the comparative examples and the examples of the present disclosure were used for color matching after changing the color by using Pantone's color system. The results were shown in Table 4 below. These photochromic polypropylene fibers would turn purple when exposed to the ultraviolet light or sunlight.

TABLE 4

| | Pantone color number |
|---|---|
| Comparative Example 1 | 17-2627TP<br>18-2333TP |
| Comparative Example 2 | 16-3320TP<br>18-3224TP |
| Comparative Example 3 | 14-3207TP<br>15-3214TP |
| Comparative Example 4 | 14-3207TP<br>15-3214TP |
| Comparative Example 5 | 15-2913TP<br>16-3116TP |
| Comparative Example 6 | 16-3416TP<br>17-3323TP |
| Comparative Example 7 | 16-3416TP<br>17-3323TP |
| Comparative Example 8 | 14-3612TP<br>16-3525TP |
| Example 1 | 15-2913TP<br>16-3116TP |

TABLE 4-continued

| | Pantone color number |
|---|---|
| Example 2 | 16-3416TP |
| | 17-3323TP |
| Example 3 | 16-3520TP |
| | 18-3533TP |
| Example 4 | 14-3612TP |
| | 16-3525TP |

As mentioned above, in the photochromic polypropylene fiber of the present disclosure, after the photochromic polypropylene fiber is stimulated by light, it changes color. The service life of the stimulated fiber can be extended by adding a specific ratio of the ultraviolet light absorber including

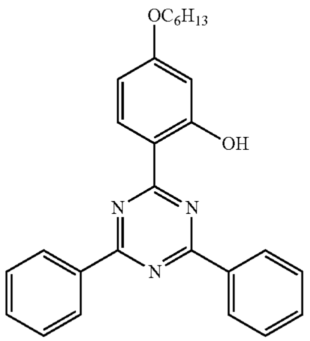

and the light stabilizer including

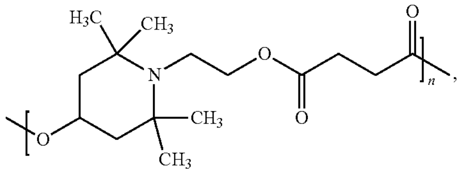

(n is 10-14) into polypropylene. In addition, the fiber background color can be reduced and the fiber color change effect can be more obvious by adding a specific proportion of phosphite antioxidants.

It will be apparent to those ordinarily skilled in the art that various modifications and variations may be made to the structure of the present disclosure without departing from the scope or spirit of the invention. In view of the foregoing, it is intended that the present disclosure cover modifications and variations thereof provided they fall within the scope of the following claims.

What is claimed is:

1. A preparation method of a photochromic polypropylene fiber, comprising:

preparing a photochromic masterbatch, comprising uniformly mixing 95 parts by weight of polypropylene and 5 parts by weight of a photochromic agent, and performing a powder refining step, a powder dispersion step, and a compounding and granulation step to form the photochromic masterbatch;

preparing an ultraviolet light absorber masterbatch, comprising uniformly mixing 90 parts by weight of polypropylene and 10 parts by weight of an ultraviolet light absorber, and performing a powder refining step, a powder dispersion step, and a compounding and granulation step to form the ultraviolet light absorber masterbatch, wherein the ultraviolet light absorber comprises

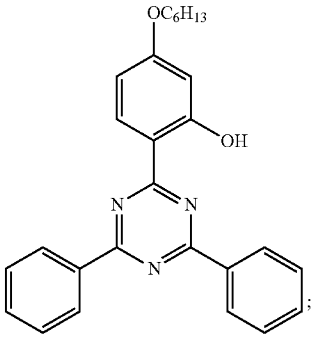

;

preparing a light stabilizer masterbatch, comprising uniformly mixing 90 parts by weight of polypropylene and 10 parts by weight of a light stabilizer, and performing a powder refining step, a powder dispersion step, and a compounding and granulation step to form the light stabilizer masterbatch, wherein the light stabilizer comprises

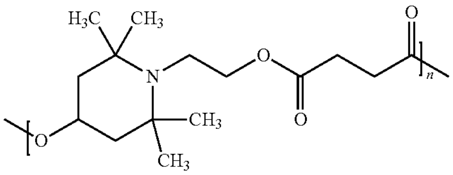

, and n is 10 to 14;

performing a masterbatch mixing step, comprising mixing 100 parts by weight of the photochromic masterbatch, 10-100 parts by weight of the ultraviolet light absorber masterbatch, 10-100 parts by weight of the light stabilizer masterbatch, and 760-800 parts by weight of polypropylene masterbatch to obtain a photochromic polypropylene mixture; and performing a melt-spinning step, comprising melt-spinning the photochromic polypropylene mixture to obtain the photochromic polypropylene fiber.

2. The preparation method of the photochromic polypropylene fiber of claim 1, further comprising:

preparing an antioxidant masterbatch, comprising uniformly mixing 90 parts by weight of polypropylene and 10 parts by weight of an antioxidant, and performing a powder refining step, a powder dispersion step, and a compounding and granulation step to form the antioxidant masterbatch; and adding 25 parts by weight of the antioxidant masterbatch in the masterbatch mixing step to form the photochromic polypropylene mixture.

3. The preparation method of the photochromic polypropylene fiber of claim 2, wherein the antioxidant is a phosphite antioxidant comprising spiro phosphate and derivatives thereof.

4. The preparation method of the photochromic polypropylene fiber of claim 3, wherein the phosphite antioxidant has a structure represented by any one of the following formula (1) to formula (4):
formula (1)
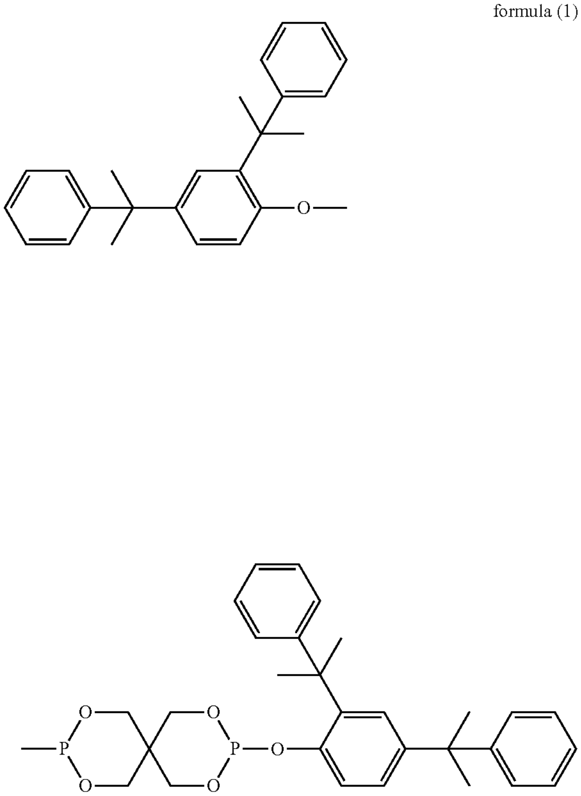
-continued
formula (2)
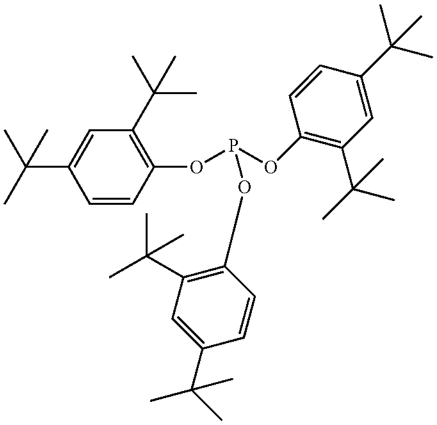
formula (3)
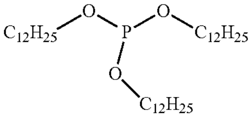
formula (4)
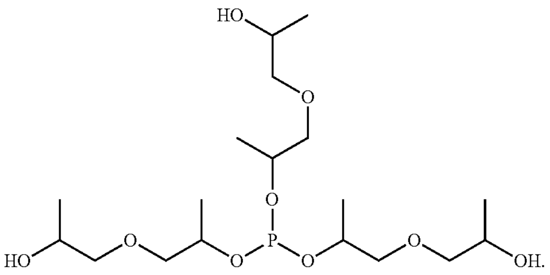
* * * * *